Oct. 26, 1965   L. F. URRY   3,214,298
LEAK-RESISTANT DRY CELL
Filed May 1, 1961

INVENTOR.
LEWIS F. URRY
BY John F. Hohmann
ATTORNEY

United States Patent Office 3,214,298
Patented Oct. 26, 1965

3,214,298
LEAK-RESISTANT DRY CELL
Lewis F. Urry, Parma, Ohio, assignor to Union Carbide Corporation, a corporation of New York
Filed May 1, 1961, Ser. No. 106,767
6 Claims. (Cl. 136—107)

This invention relates to leak-resistant dry cells.

The so-called Leclanché dry cell used for flashlights, portable radios, photoflash and other devices has gone through an evolution of improvements during the past decade or more in an attempt by manufacturers to prevent leakage from the cell during and after its use. These improvements have generally increased the cost of manufacturing the cells and little has been done in the way of offsetting these costs in order to produce a dry cell more economically but without at the same time sacrificing the leak-resistant characteristics of the cell.

A dry cell which has been widely used commercially comprises a cupped shaped container-anode of a consumable metal having therein a depolarizer mix, electrolyte and a carbon electrode embedded within the depolarizer mix. This type of dry cell has been placed in a closed container, preferably one of a non-corrodible type, which has generally proven satisfactory for prohibiting leakage. One disadvantage however of the dry cell construction is that the container-anode of the cell generally is possessed of more than a sufficient quantity of anode material, for instance, zinc, for operating the cell during its useful life. This excess material has generally been utilized because the container-anode also serves as a container for liquid exudate which is formed within the cell. For example, it has been the practice to extend the upper edges of the container-anode above the depolarizer mix of the cell thus providing a space for receiving and containing the liquid exudate within the cell. These edges of the container-anode perform no useful function as far as operating the cell and generally have increased the cost of manufacturing the cell. Furthermore, the bottom of the container-anode has been insulated by a paper washer and also has served no useful function other than to prevent the escape of liquid from the cell. Heretofore, attempts to construct a dry cell more economically by eliminating these portions of the container-anode have only led to leakage problems, obviously because its purpose as a container is destroyed.

It is therefore the principal object of the invention to provide a leak-resistant dry cell which can be more economically manufactured.

More specifically, another object is to provide a dry cell which utilizes a minimum of anode material without the sacrifice of the leak-resistant characteristics of the cell.

Figure 1:
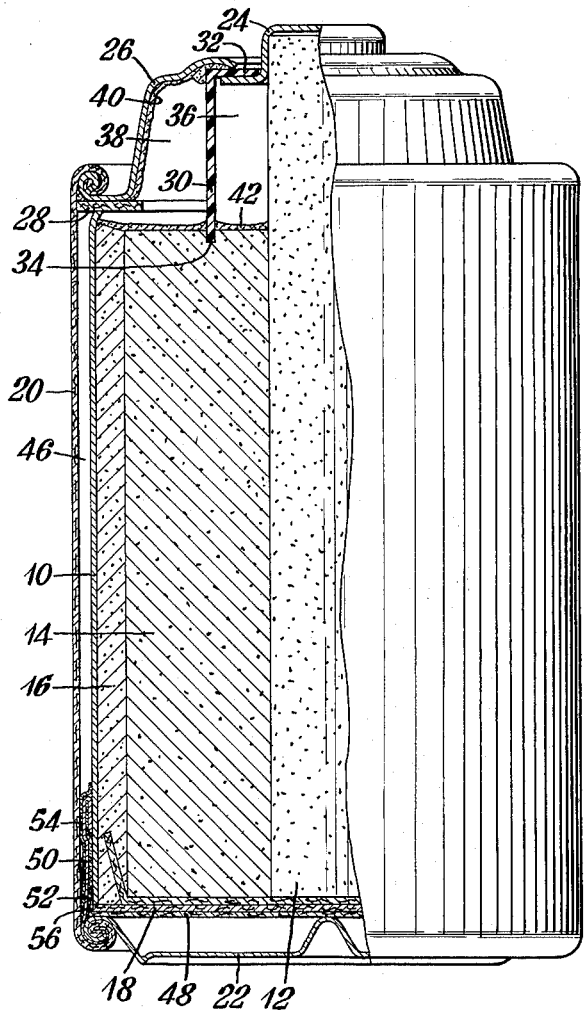
Figure 2:
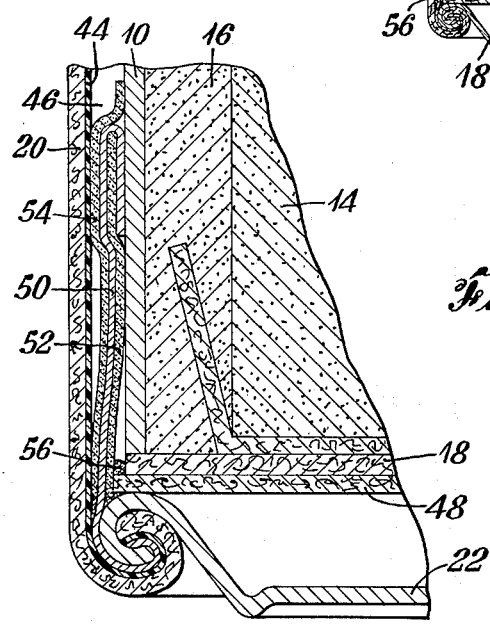

In the accompanying drawing:

FIG. 1 is a vertical elevation partially in section of a leak-resistant dry cell embodying the invention; and FIG. 2 is an enlarged detail sectional view of the bottom portion of the dry cell illustrated in FIG. 1.

In accordance with the invention, a leak-resistant dry cell is provided with a tubular shaped container-anode embraced by a non-metallic jacket having locked thereto a top closure and a metallic bottom plate. The interior of the jacket is provided with a liquid-proof liner and an electrically conductive strip of foil is positioned in contact with the container-anode, the strip also making electrical contact with the bottom plate in the locked engagement of the bottom plate with the jacket. A shield disc is positioned within the lower edges of the jacket and protects the bottom plate against corrosion. A partition seal of the type disclosed and claimed in my copending application, Serial No. 106,760, filed currently herewith, is positioned below the top closure of the cell.

Referring now to the drawing, a leak-resistant dry cell embodying the invention is provided with a tubular shaped container-anode 10 of a consumable metal, for instance, zinc surrounding a conventional type of bobbin consisting of a carbon electrode 12 embedded within a depolarizer mix 14 but separated from the bobbin by an immobilized electrolyte 16 suitably in the form of a conventional "paste," the lower edges of the tubular shaped container-anode 10 resting on a bottom cover plate 18 suitably of paper impregnated with a liquid-repellent material, for example, wax. The cell as shown is encased within a jacket 20 having locked thereto a top closure and a metallic bottom plate 22.

The top closure for the cell comprises a flanged metal cap 24 fitted on top of the carbon electrode 12 and an annular substantially cup shaped metallic top cover 26 whose outer edges are locked in engagement with the jacket 20 just above the upper edges of the container-anode 10 but insulated therefrom by a paper washer 28. Below the top closure a partition seal of the type disclosed in my above-referred copending application is provided comprising a tube 30 having an inwardly flanged upper end 32 which is fitted over the flanged cap 24 and on which rests the inner peripheral edges of the top cover 26, thereby securing the tube 30 within the top closure and insulating the metal cap 24 from the top cover 26. The tube 30 surrounds but is spaced from the carbon electrode 12 and is embedded at its lower end within the depolarizer mix 14 at the junction 34, defining a free space 36 between the tube 30 and the carbon electrode 12 and an outer exudate chamber 38. The tube 30 preferably is molded together with the flanged end 32 from a plastic material, for example, polyethylene. The top cover 26 preferably is coated on its underneath side with a thin layer 40 of a liquid-repellent material, for example, vinyl resin or lacquer, for preventing against its corrosion. A layer 42 of a moisture-proof material is also preferably applied over the top surface of the depolarizer mix 14 for prohibiting the ingress of atmospheric oxygen into the cell, but at the same time permitting gas to be vented from within the depolarizer mix 14, asphalt, vinyl resin or grease having been used successfully for this purpose.

The jacket 20 is of a non-corrodible type preferably composed of a bibulous paper, for instance, kraft paper and has provided to its inner surfaces a liquid-proof liner 44 preferably composed of a plastic film, for example, polyethylene terephthalate as best shown in enlarged detail in FIG. 2. This construction conveniently lends itself to incorporating the liquid-proof liner 44 by spiral winding techniques during manufacture of the jacket 20. The liquid-proof liner 44 may also be adhesively bonded to the interior of the jacket 20 after the latter has been manufactured. The jacket 20 also fits the cup electrode 10 rather loosely, thereby providing a supplementary chamber 46 for receiving liquid exudate from the cell during its use.

The construction for the dry cell described also utilizes a shield for the bottom plate 22 comprising a disc 48 tightly fitted within the lower edges of the jacket 20 just beneath the bottom cover plate 18 and between it and the bottom plate 22. A foil strip 50, for example, aluminum foil, is provided between the jacket 20 and the exterior walls of the container-anode 10, and makes electrical contact between the container-anode 10 and the bottom plate 22. As best shown in FIG. 2, one end of the strip 20 and the bottom plate 22, and the other end is positioned in contact with the container-anode 10. An insulating strip 52, for instance, an adhesive tape, is preferably adhered to the exterior wall of the container-anode 10, the foil strip 50 being curled over and around the insulating strip 52 at the point where is makes contact with the exterior walls of the container-anode 10. Preferably, another insulating strip 54 overlies the foil strip 50 and protects against its being corroded. The shield disc 48 preferably is sealed at its peripheral edges to the jacket 20 suitably with wax, for example, as indicated at 56 in enlarged detail in FIG. 2. The shield disc 48 protects the bottom plate 22 against corrosion and suitably is composed of paper made resistat to penetration of liquid by a liquid repellent impregnant also suitably of wax, for example.

Having described the construction of a dry cell embodying the invention, its mode of operation may now be visualized. During use of the cell, especially under severe conditions, gas is released. The gas follows a path through or around the carbon electrode 12 in the depolarizer mix 14, into the free space 36 and through the electrode 12, or directly into the electrode 12 from within the depolarizer mix 14, and then out of the cell, for example, by being vented between the flanged metal cap 24 and the upper flanged end 32 of the tube 30 in the top closure. At the same time, liquid is exuded through the depolarizer mix 14 towards the tubular shaped container-anode 10 and eventually collects within the exudate chamber 38 but is barred from entering the free space 36 by the tube 30. The junction 34 prevents liquid from creeping along the top of the depolarizer mix 14 into the free space 36 and blocking the passage of gas through the cell. The partition seal described also prevents the establishment of short-circuit paths between the electrodes of the cell by the deposition of spongy zinc metal over the depolarizer mix 14 as disclosed in my above referred to copending application.

It will be appreciated that a dry cell incoporating the novel features of the invention is easily constructed and economically manufactured. In prior dry cell constructions a cupped container-anode has been used, but this type of container has proven to be a disadvantage from the standpoint of cost in that the bottom and upper portions of the container-anode perform no useful function other than for containing liquid exudate within the cell. The present construction utilizes a tubular shaped container-anode which is designed to be completely consumed during use of the cell, thus representing a considerable savings in cost over prior constructions. Specifically, it will be noted that the interior of the container-anode of the present construction is completely filled by its contents between its upper and lower edges, hence the whole of the container-anode is available for electrochemical reaction when the dry cell is subjected to use, and no material is wasted for purposes other than for operating the cell. Further, in actual practice, the wall thickness of the tubular shaped container-anode is chosen of such dimension as is sufficient to provide just enough anode material for operating the cell. At the same time, it will also be appreciated that the present dry cell construction, while it is capable of being manufactured more economically, also permits continuous venting of gas from the cell during its use and is highly resistant to leakage.

A number of dry cells embodying the invention have been made and tested over a wide range of conditions. The dry cells made, when compared to conventional cells, represented a savings in cost upwardly of about 30 percent, and when tested consistently demonstrated the effectiveness of the invention in that no evidence of leakage from the cell container or damage from pressure build up of gas was observed.

It will be appreciated that many variations and modifications of the dry cell construction described herein will become apparent to those skilled in the art. For example, a dry cell incorporating the novel features of the invention may utilize any one of the several shield disc constructions for the bottom closure disclosed and claimed in my copending application, Serial No. 106,761, now Patent No. 3,115,428, filed concurrently herewith, and now United States Patent No. 3,115,428, issued on December 24, 1963.

I claim:

1. A leak-resistant dry cell comprising, in combination, an open-ended tubular shaped container-anode of a consumable metal having therein a depolarizer mix, electrolyte and a carbon electrode embedded within said depolarizer mix; a nonmetallic jacket having a liquid-proof liner on its innermost surfaces embracing said container-anode; a top closure and a metallic bottom plate locked in engagement with said jacket, said top closure having gas venting means therein; a partition seal having an an open-ended tubular shape and surrounding the carbon electrode between said top closure and said depolarizer mix providing a free space between said seal and said carbon electrode and an exudate chamber surrounding said seal, said seal being embedded within said depolarizer mix and defining a barrier which protects said carbon electrode against contact by cell exudate, said seal in conjunction with said gas venting means in said top closure providing a path for venting gas from said cell; a shield disc fitted tightly within the lower edges of said jacket; and an electrically conductive strip positioned in contact with said container-anode and making electrical contact with said bottom plate in the locked engagement of said bottom closure with said jacket.

2. A leak-resistant dry cell as defined by claim 1 in which said partition seal comprises an open-ended tube secured within said top closure at its upper end and at its lower end embedded within said depolarizer mix.

3. A leak-resistant dry cell as defined by claim 2 in which said top closure comprises a flanged metal cap fitted over said carbon electrode and an annular substantially cupped shaped metal cover, and in which said tube is provided with a flanged upper end positioned between said metal cap and the inner peripheral edges of said metal cover.

4. A leak-resistant dry cell as defined by claim 1 in which said open-ended tubular shaped container-anode is coextensive with its contents.

5. A leak-resistant dry cell as defined by claim 1 in which said electrically conductive strip is of metal foil.

6. A leak-resistant dry cell as defined by claim 1 in which said electrically conductive strip is positioned in contact with the exterior walls of said container-anode and in which said strip is protected against corrosion by at least one strip of insulation.

References Cited by the Examiner

UNITED STATES PATENTS

| 2,707,200 | 4/55 | Urry et al. | 136—133 |
| 2,850,558 | 9/58 | Urry | 136—133 |
| 3,016,414 | 1/62 | Priebe | 136—107 |
| 3,051,769 | 8/62 | Jammet | 136—133 |

FOREIGN PATENTS

| 1,216,672 | 11/59 | France. |
| 1,239,964 | 7/60 | France. |

JOHN H. MACK, *Primary Examiner.*

JOHN R. SPECK, JOSEPH REBOLD, *Examiners.*